United States Patent
Nishikawa et al.

(10) Patent No.: US 10,910,610 B2
(45) Date of Patent: Feb. 2, 2021

(54) POWER STORAGE SYSTEM AND MANAGEMENT DEVICE

(71) Applicant: Panasonic Intellectual Property Management Co., Ltd., Osaka (JP)

(72) Inventors: Kazufumi Nishikawa, Osaka (JP); Takashi Iida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/088,332

(22) PCT Filed: May 11, 2017

(86) PCT No.: PCT/JP2017/017793
§ 371 (c)(1),
(2) Date: Sep. 25, 2018

(87) PCT Pub. No.: WO2017/203985
PCT Pub. Date: Nov. 30, 2017

(65) Prior Publication Data
US 2019/0109306 A1   Apr. 11, 2019

(30) Foreign Application Priority Data
May 26, 2016   (JP) .................. 2016-105375

(51) Int. Cl.
*H01M 2/10*   (2006.01)
*H02J 7/34*   (2006.01)
(Continued)

(52) U.S. Cl.
CPC .......... *H01M 2/1016* (2013.01); *H01M 2/10* (2013.01); *H01M 10/48* (2013.01);
(Continued)

(58) Field of Classification Search
None
See application file for complete search history.

(56) References Cited

U.S. PATENT DOCUMENTS

2008/0280192 A1* 11/2008 Drozdz ................... B60K 6/28
429/62
2012/0256569 A1   10/2012 Kawahara et al.
(Continued)

FOREIGN PATENT DOCUMENTS

| JP | 2014-203536 A | 10/2014 |
| WO | 2011/045853 A1 | 4/2011 |

OTHER PUBLICATIONS

International Search Report dated Jun. 13, 2017, issued in counterpart International Application No. PCT/JP2017/017793 (2 pages).

*Primary Examiner* — Carmen V Lyles-Irving
(74) *Attorney, Agent, or Firm* — Westerman, Hattori, Daniels & Adrian, LLP (57) ABSTRACT

A power storage unit includes a plurality of power storage module groups connected in parallel, each having a plurality of power storage modules connected in series or in series and parallel. A plurality of temperature adjustment units is installed in each of the power storage module groups constituting the power storage unit, and cools or heats the power storage module groups. A management unit controls the plurality of temperature adjustment units corresponding to each of the power storage module groups to make resistances of the plurality of power storage module groups come close.

4 Claims, 9 Drawing Sheets

(51) Int. Cl.
*H01M 10/615* (2014.01)
*H01M 10/633* (2014.01)
*H01M 10/6563* (2014.01)
*H01M 10/647* (2014.01)
*H01M 10/6568* (2014.01)
*H01M 10/6571* (2014.01)
*H01M 10/627* (2014.01)
*H01M 10/613* (2014.01)
*H01M 10/48* (2006.01)
*H02J 1/10* (2006.01)
*H02J 7/00* (2006.01)

(52) U.S. Cl.
CPC ....... *H01M 10/613* (2015.04); *H01M 10/615* (2015.04); *H01M 10/627* (2015.04); *H01M 10/633* (2015.04); *H01M 10/647* (2015.04); *H01M 10/6563* (2015.04); *H01M 10/6568* (2015.04); *H01M 10/6571* (2015.04); *H02J 1/10* (2013.01); *H02J 7/0029* (2013.01); *H02J 7/0047* (2013.01); *H02J 7/34* (2013.01); *H02J 2007/0067* (2013.01)

(56) References Cited

U.S. PATENT DOCUMENTS

2015/0217659 A1* 8/2015 Seimiya .................. B60K 1/04
429/71
2018/0037134 A1* 2/2018 Weicker ................ H01M 16/00

\* cited by examiner

POWER STORAGE SYSTEM AND MANAGEMENT DEVICE

TECHNICAL FIELD

The present invention relates to a power storage system including plurality of power storage modules, and a management device.

BACKGROUND ART

Recently, a power storage system has been, widespread, and is used for a peak shift, backup, a frequency regulation (FR), and the like. A huge power storage system is constructed by, for example, connecting in parallel a plurality of power storage racks each including by connecting in series a plurality of power storage modules.

When a temperature difference exists among the power storage racks connected in parallel, a variation occurs in internal resistances of the power storage modules due to the temperature difference, causing a resistance difference among the plurality of power storage racks. For example, when the power storage system is installed indoors, a temperature difference occurs between a power storage rack near an air conditioner and a power storage rack away from the air conditioner. The internal resistance of the power storage module becomes larger as its temperature becomes lower.

CITATION LIST

Patent Literature

PTL 1: Unexamined Japanese Patent Publication No. 2014-203536

SUMMARY OF THE INVENTION

When a resistance difference occurs among the plurality of, power storage racks, a occurs in charge and discharge current among the plurality of power storage racks. When a variation in current occurs, it becomes difficult to secure the maximum power supply of the power storage system. Specifically, current flowing in a power storage rack whose temperature is low and whose resistance is large becomes small. In contrast, although a power storage rack whose temperature is high and whose resistance is small tries to increase current, a breakdown voltage or an allowable current is set in each element composing the power storage rack, making it impossible to flow current exceeding the allowable current. Therefore, when a resistance difference occurs among the plurality of power storage racks connected in parallel, current flowing in the whole plurality of power storage racks connected in parallel is reduced, resulting in lowering of power supply capacity.

The present invention has been conceived in light of such circumstances, and an object thereof is to provide a technique for reducing a variation of currents among a plurality of power storage module groups connected in parallel.

In order to solve the above problem, a power storage system, of an aspect of the present invention includes:

a power storage unit in which a plurality of power storage module groups are connected in parallel, each of the plurality of power storage module groups including a plurality of power storage modules connected in series or in series and parallel;

a plurality of temperature adjustment units installed each of the power storage module groups constituting the power storage unit and configured to cool or heat the power storage module groups; and a management unit configured to control each of the plurality of temperature adjustment units corresponding to each of the power storage module groups to make resistances of the plurality of power storage module groups come close.

Any desired combinations of the above-described components and converted expressions of the present invention in methods, devices, systems, and other similar entities are still effective as aspects of the present invention.

Advantageous Effect of Invention

The present invention makes it possible to reduce a variation of currents in the respective plurality of power storage modules connected in parallel.

DESCRIPTION OF EMBODIMENT

Figure 1:
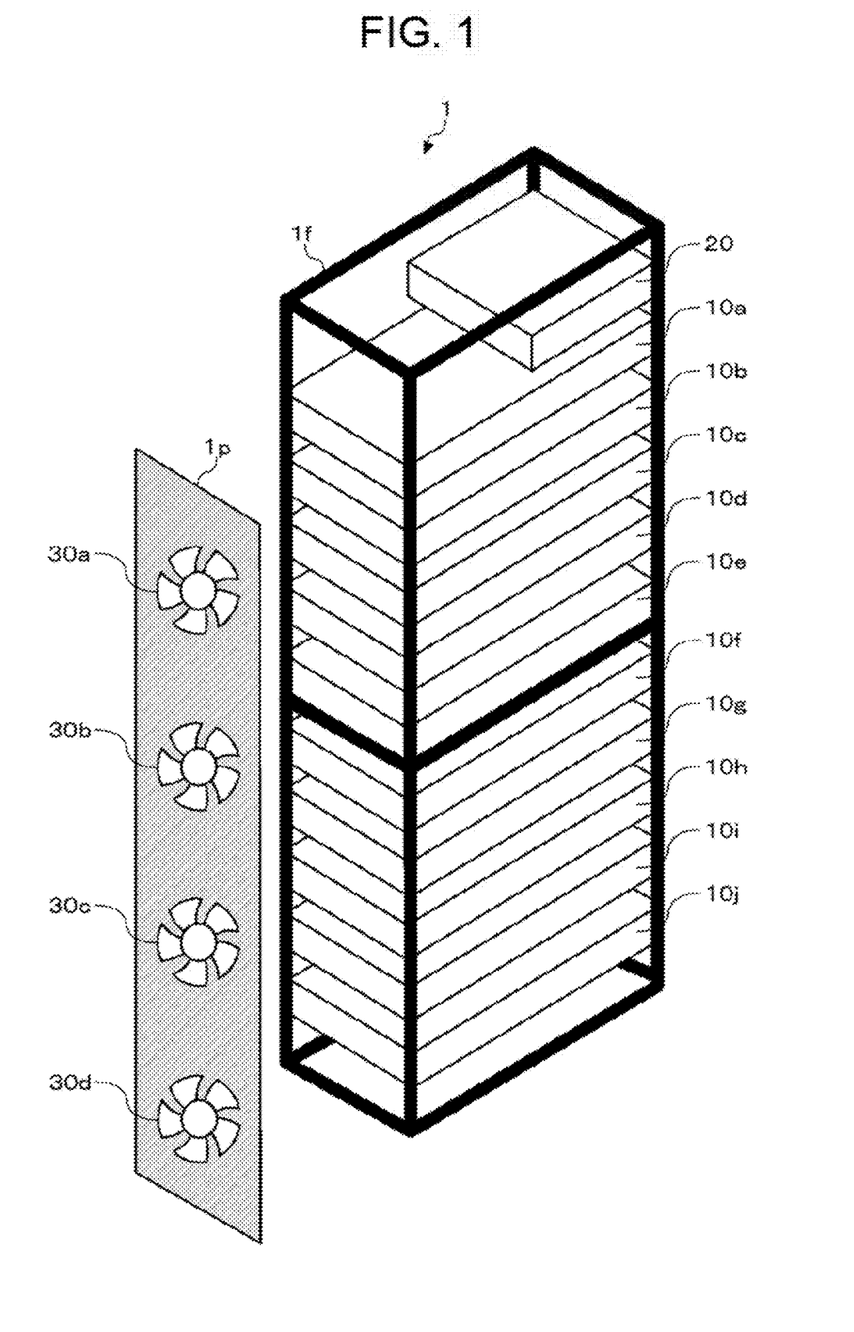
FIG. 1 is a schematic perspective view illustrating a configuration example of a power storage rack constituting a power storage system according to an exemplary embodiment of the present invention.

FIG. 1 is a schematic perspective view illustrating a configuration example of power storage rack 1 constituting power storage system es according to an exemplary embodiment of the present invention. Power storage rack 1 is structured by stacking a plurality of power storage modules 10a to 10j and circuit device 20 in a rack frame 1f having a rectangular parallelepiped shape. Power storage modules 10a to 10j and circuit device 20 are housed in respective metal housings or resin housings each having a rectangular parallelepiped shape. In the example illustrated in FIG. 1, the plurality of power storage modules 10a to 10j is fixed to rack frame 1f at intervals by, for example, screws. Circuit device 20 is fixed to rack frame 1f with a gap above the plurality of power storage modules 10a to 10j.

Fan mounted plate 1p on which a plurality of fans 30a to 30d is fixed is attached on a side surface of power storage rack 1. The plurality of fans 30a to 30d is installed on fan mounted plate 1p at regular intervals. Note that, in FIG. 1, an example is illustrated in which a number of fans 30 is four and a number of power storage modules 10 is ten, but the number of fans 30 and the number of power storage modules 10 are options. For example, the number of fans 30 and the number of power storage modules 10 may be equal, or the former may be smaller or larger than the latter.

Note that, FIG. 1 illustrates a state before fan mounted plate 1p is attached to rack frame 1f. Furthermore, lines such as power lines, communication lines, and control signal lines are omitted in FIG. 1 for simplification of the drawing.

Figure 2:
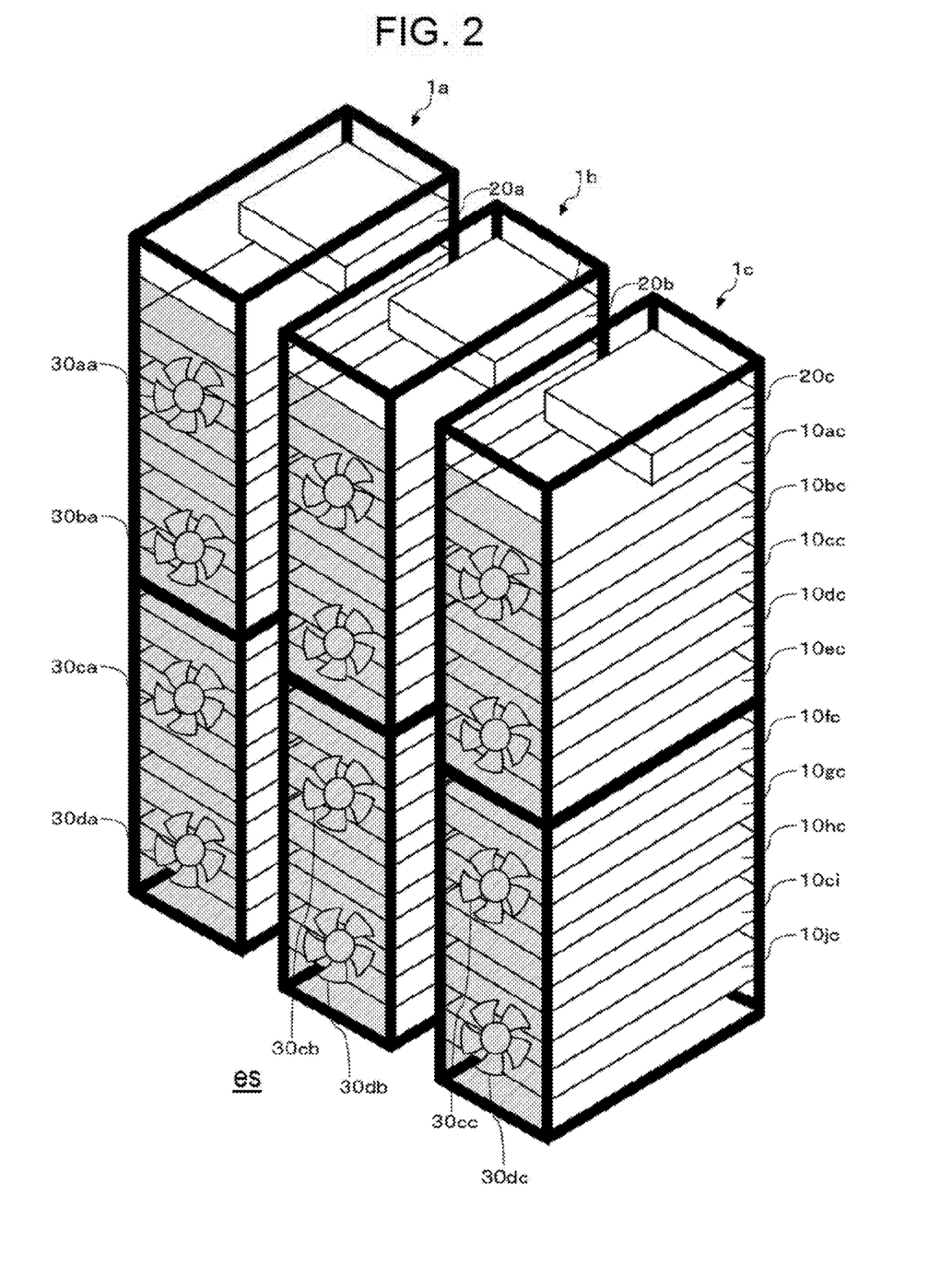
FIG. 2 is a schematic perspective view illustrating a configuration example of the power storage system according to the exemplary embodiment of the present invention.

FIG. 2 is a schematic perspective view illustrating a configuration example of power storage system es according to the exemplary embodiment of the present invention. Power storage system es is configured by installing a plurality of power storage racks 1 illustrated in FIG. 1, connected in parallel. The plurality of power storage racks 1a to 1c are connected in parallel and connected to a system or a load. Although an example is illustrated in which three power storage racks 1a to 1c are connected in parallel in FIG. 2, the parallel number is not limited to three. Furthermore, lines such as power lines, communication lines, and control signal lines are also omitted in FIG. 2 for simplification of the drawing.

Figure 3:
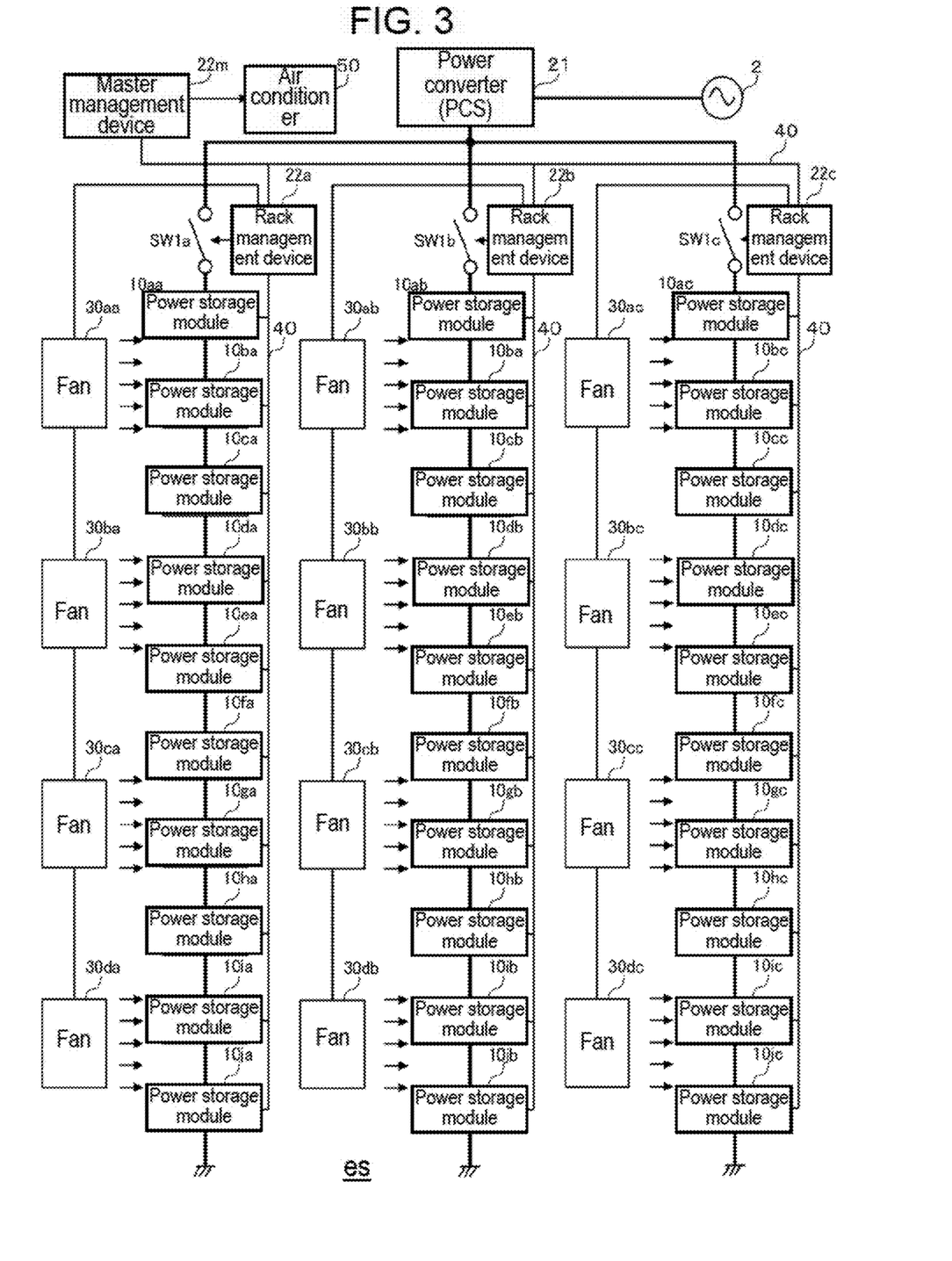
FIG. 3 is a diagram illustrating a circuit configuration of power storage system es of FIG. 2.

FIG. 3 is a diagram illustrating a circuit configuration of power storage system es of FIG. 2. Power storage system 1 includes the plurality of power storage racks 1a to 1c connected in parallel, power converter 21, and master management device 22m. First power storage rack 1a includes a plurality of power storage modules 10aa to 10ja connected in series, circuit device 20a, switch SW1a, a plurality of fans 30aa to 30da. Circuit device 20a includes rack management device 22a. Second power storage rack 1b and third power storage rack 1c also have the same configuration as that of first power storage rack 1a.

Power converter 21 and master management device 22m are included in any of the plurality of circuit devices 20a to 20c. Note that power converter 21 may be housed in another housing independent from the housings of circuit devices 20a to 20c illustrated in FIG. 2.

Power routes for discharge and charge of the plurality of power storage racks 1a to 1c are joined together, and connected to power converter 21. Power converter 21 is connected between the plurality of power storage racks 1a to 1c and system 2. Power converter 21 converts DC power discharged from the plurality of power storage racks 1a to 1c into AC power to output it to system 2, and converts the AC power input from system 2 into DC power to charge the plurality of power storage racks 1a to 1c.

Power converter 21 can be configured of a general power conditioner system (PCS), and includes a bidirectional DC-DC converter (not shown) and a bidirectional inverter (not shown). The bidirectional DC-DC converter controls constant current (CC) charge/discharge, or constant voltage (CV) charge/discharge, and the bidirectional inverter converts DC power into AC power or convers AC power into DC power. Note that, the bidirectional inverter may serve the both functions instead of using the bidirectional DC-DC converter.

Switch SW1a of first power storage rack 1a is inserted between power converter 21 and the plurality of power storage modules 10aa to 10ja. For example, a relay or a semiconductor switch can be used for switch SW1a. Switch SW1a is on/off controlled by rack management device 22a. For example, when overcurrent occurs, switch SW1a is turned off by rack management device 22a. Switch SW1b of second power storage rack 1b and switch SW1c of third power storage rack 1c are the same as switch SW1a of first power storage rack 1a.

Figure 4:
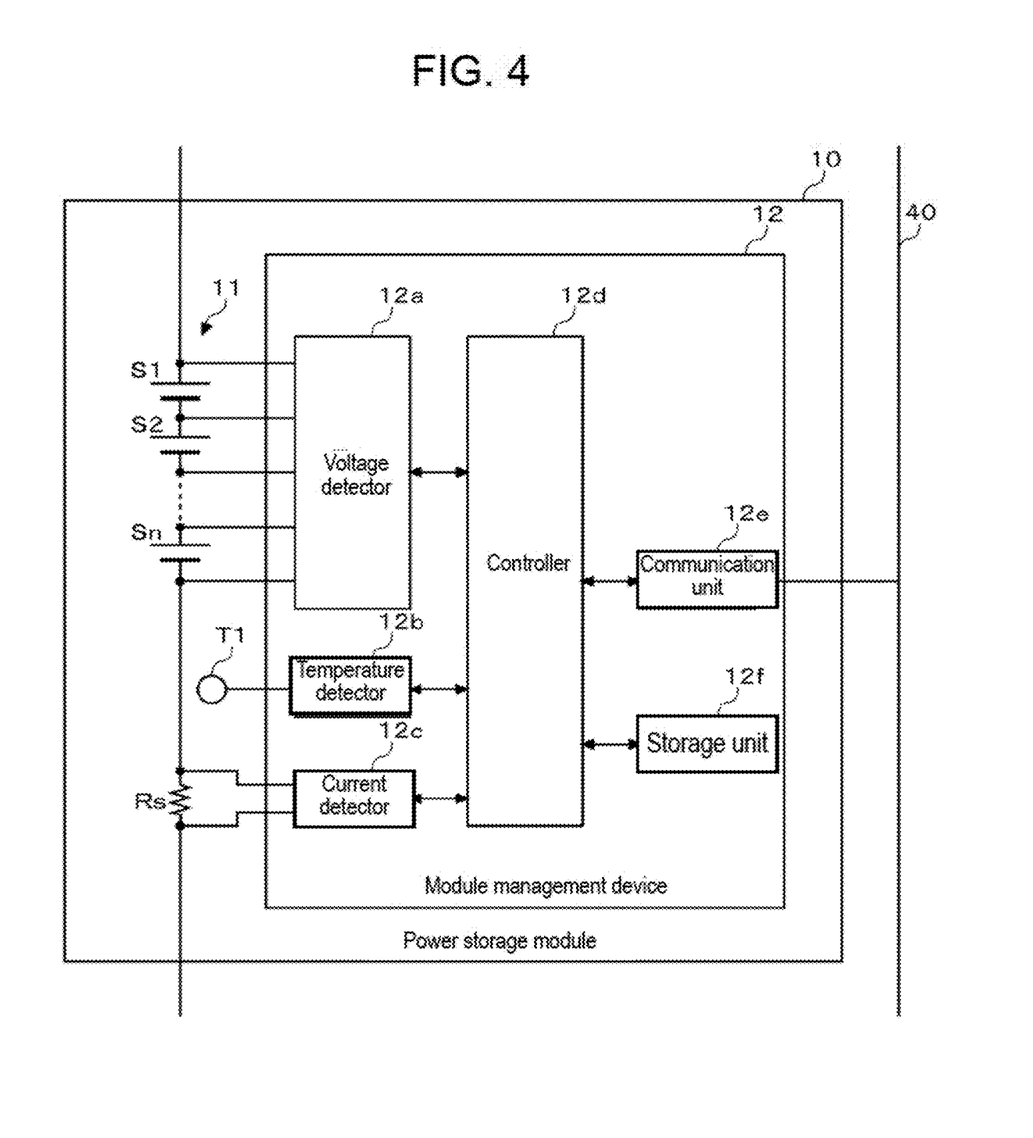
FIG. 4 is a circuit configuration example of each power storage module of FIG. 1 to FIG. 3.

FIG. 4 is a diagram illustrating a circuit configuration example of each of power storage modules 10 of FIG. 1 to FIG. 3. Power storage module 10 includes power storage unit 11, temperature sensor T1, shunt resistor Rs, and module management device 12. Power storage unit 11 includes a plurality of cells S1 to in connected in series. A lithium ion battery cell, a nickel hydrogen battery cell, an electric double layer capacitor cell, a lithium ion capacitor cell, or the like can be used for the cells. Hereinafter, in the present description, an example using lithium ion battery cells (nominal voltage: 3.6 to 3.7 V) is assumed. Note that power storage unit 11 is not limited to an example including a plurality of cells connected in series, and may have a structure including a plurality of cells connected in series and parallel.

Shunt resistor Rs is connected to the plurality of cells S1 to Sn in series. Shunt resistor Rs functions as a current detection element. Note that a Hall element may be used instead of shunt resistor Rs. Temperature sensor T1 for detecting a temperature of the plurality of cells S1 to Sn is installed near the plurality of cells S1 to Sn. For example, a thermistor can be used for temperature sensor T1. Although only one temperature sensor T1 is illustrated in FIG. 4, a plurality of temperature sensors T1 (e.g., three to five temperature sensors T1) may be installed in one power storage module 10.

Module management device 12 includes voltage detector 12a, temperature detector 12b, current detector 12c, controller 12d, communication unit 12e, and storage unit 12f. Voltage detector 12a detects voltages of the respective plurality of cells S1 to Sn and outputs them to controller 12d. Temperature detector 12b estimates a temperature of the plurality of cells S1 to Sn on the basis of an output value of temperature sensor T1, and outputs it to controller 12d. When a plurality of temperature sensors T1 are installed, temperature detector 12b calculates an average of output values of the respective plurality of temperature sensors T1 and estimates a temperature of the plurality of cells S1 to Sn. Current detector 12c includes an error amplifier connected to both ends of shunt resistor Rs, and the error amplifier detects a voltage across shunt resistor Rs. Current detector 12c detects a current flowing in power storage unit 11 on the basis of the voltage across shunt resistor Rs, and outputs it to controller 12d.

Controller 12d manages power storage unit 11 on the basis of the voltage, the current, and the temperature of the plurality of cells S1 to Sn detected by voltage detector 12a, current detector 12c, and temperature detector 12b, respectively. For example, controller 12d performs a state of charge (SOC) management, equalization control, and the like of the plurality of cells S1 to Sn.

A configuration of controller 12d can be provided by cooperation of hardware and software resources, or hardware resources alone. A microcomputer, a digital signal processor (DSP), a field programmable gate array (FPGA), or another large-scale integration (LSI) can be used as the hardware resources. A program such as firmware can be used as the software resources. Storage unit 121 can be provided by a read only memory (ROM) and, a random access memory (RAM).

Controller 12d estimates the SOC of cells S1 to Sn. The SOC can be estimated by, for example, an open circuit voltage (OCV) method and/or a current integration method. A stable relationship exists between the SOC and the OCV in a lithium ion battery. Thus, the SOC of each of cells S1 to Sn can be estimated by detecting the voltage across each of cells S1 to Sn in a state where no current flows in cells S1 to Sn. Increase and decrease of the SOC can be estimated by the current integration method while currents flow in cells S1 to Sn. Storage unit 12f stores various programs, data, a reference table, and the like.

Communication unit 12e performs predetermined communication control processing (e.g., communication control processing complying standards such as TCP/IP, RS-485, or the like), and communicates with other power storage modules 10 and/or corresponding one of rack management devices 22a to 22c via communication line 40. A metal cable may be used for communication line 40, or an optical fiber cable may be used therefor.

First rack management device 22a controls switch SW1a on the basis of information of the voltages, currents, temperatures, or SOCs acquired from the respective plurality of power storage modules 10aa to 10a. Furthermore, rack management device 22a notifies master management device 22m of information of at least one of the voltages, currents, temperatures, and SOCs acquired from the respective plurality of power storage modules 10aa to 10ja via communication line 40. Second rack management device 22b and third rack management device 22c have the same configuration as that of first power storage rack 22a.

An internal resistance of the lithium ion battery is not constant, and changes depending on circumstances. The internal resistance of the lithium ion battery increases when an environmental temperature is low, when a battery capacity is small, and when a discharge current is large. Furthermore, the lithium ion battery is deteriorated for each charge and discharge, and its internal resistance increases depending on the progress of the deterioration. The most significant, change factor of the internal resistance is the temperature among the factors.

When there is a temperature variation among the plurality of power storage racks 1a to 1c, a variation occurs in resistances among respective power storage racks 1a to 1c, causing a current variation among power storage racks 1a to 1c. As described above, since there, is a limit of the upper limit current on the specification in each of power storage rack 1a to 1c, when a current variation occurs among power storage racks 1a to 1c, the maximum power supply capacity of whole power storage system es is lowered. Furthermore, progresses of deteriorations among respective power storage racks 1a to 1c become irregular, making arrival of change time become irregular.

When power storage system es is installed in an interior closed space, a temperature variation occurs among the plurality of power storage racks 1a to 1c depending on an installed position of air conditioner 50. Furthermore, when power storage system es is installed under open sky (=outside), a temperature variation occurs among the plurality of power storage racks 1a to 1c depending on environmental condition such as whether the installed position is a position of receiving direct sunlight. Therefore, in the exemplary embodiment, a mechanism for making resistances of the respective plurality of power storage racks 1a to 1c come close (be matched in ideal) is introduced.

Figure 5:
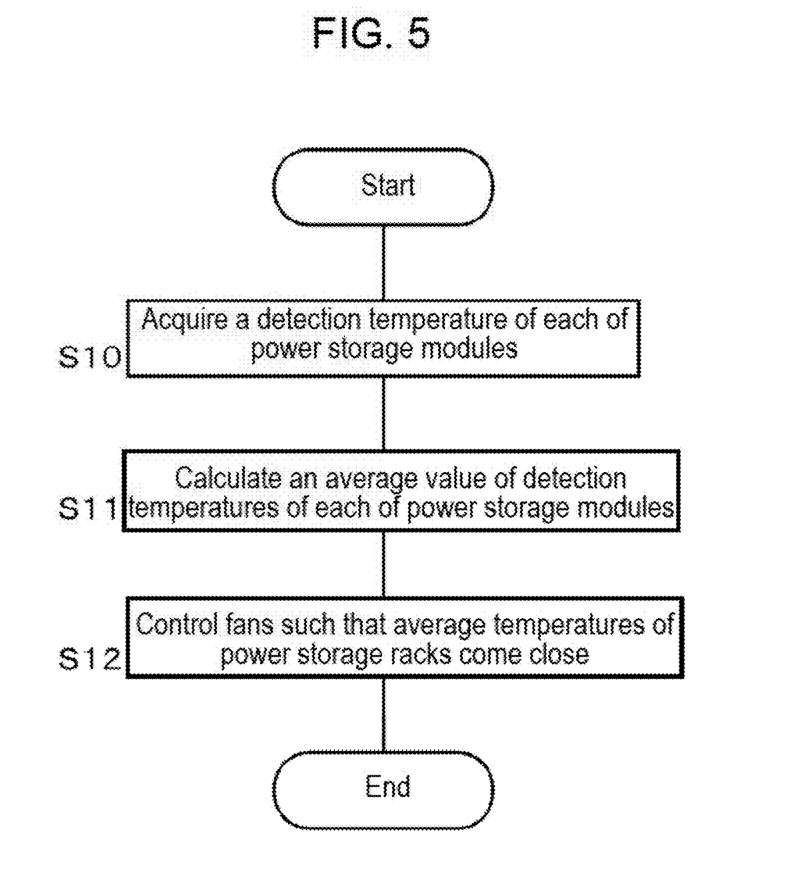
FIG. 5 is a flowchart illustrating an example of temperature management by a master management device.

FIG. 5 is a flowchart illustrating an example of temperature management by master management device 22m. Master management device 22m acquires a detection temperature of each of power storage modules 10aa to 10jc from the plurality of rack management devices 22a to 22c via communication line 40 (S10). Master management device 22m calculates an average value of the detection temperatures of the respective plurality of power storage modules 10a to 10j for each rack (S11). Note that a median value may be used instead of the average value.

Note that a configuration may be employed in which each of rack management devices 22a to 22c calculates the average value of the detection temperatures of respective power storage modules 10a to 10j included in the corresponding, rack and each of rack management devices 22a to 22c notifies master management device 22m of the average temperature.

Master management device 22m controls the plurality of fans 30aa to 30dc in a rack unit such that the average temperatures of the respective plurality of power storage racks 1a to 1c come close (S12). For example, among the plurality of power storage racks 1a to 1c, fans 30a to 30d of power storage rack 1 whose temperature is lowest are made to stop. Fans 30a to 30d of power storage rack 1 whose temperature is highest are made to operate at a capacity of X % (for example, 100%). The operating capacity of fans 30a to 30d of remaining power storage rack 1 is determined on the basis of the ratio (Y/100) of a temperature difference (Y) between power storage rack 1 whose temperature is lowest and target power storage rack 1 with respect to a temperature difference (100) between power storage rack 1 whose temperature is lowest, and power storage rack 1 whose temperature is highest. That is, fans 30a to 30d of target power storage rack 1 are made to operate at a capacity of X×Y/100%.

The operating performance (capacity) of fans 30a to 30d can be controlled by adjusting a duty ratio during intermittent operation or a rotational speed. Master management device 22m determines the operating capacity of fans 30a to 30d in a rack unit, and notifies each of rack management devices 22a to 22c of the corresponding operating performance. Each of rack management devices 22a to 22c controls fans 30a to 30d included in the corresponding rack on the basis of the received corresponding operating performance.

Note that, when the average temperature of power storage rack 1 whose temperature is lowest among the plurality of power storage racks 1a to 1c is higher than an appropriate temperature range (e.g., 18° C. to 28° C.), power storage rack 1 concerned is also necessary to be cooled. In this case, master management device 22m makes all fans 30aa to 30dc operate at full capacity, and performs the above to mentioned control after the average temperature of power storage rack 1 whose temperature is lowest becomes in the appropriate temperature range. Alternatively, the operating capacity of fans 30a to 30d of each of power storage racks 1a to 1b may be determined on the basis of ratios of differences between the average temperatures of respective power storage racks 1a-1c and a reference temperature that is an upper limit of the appropriate temperature range.

Figure 6:
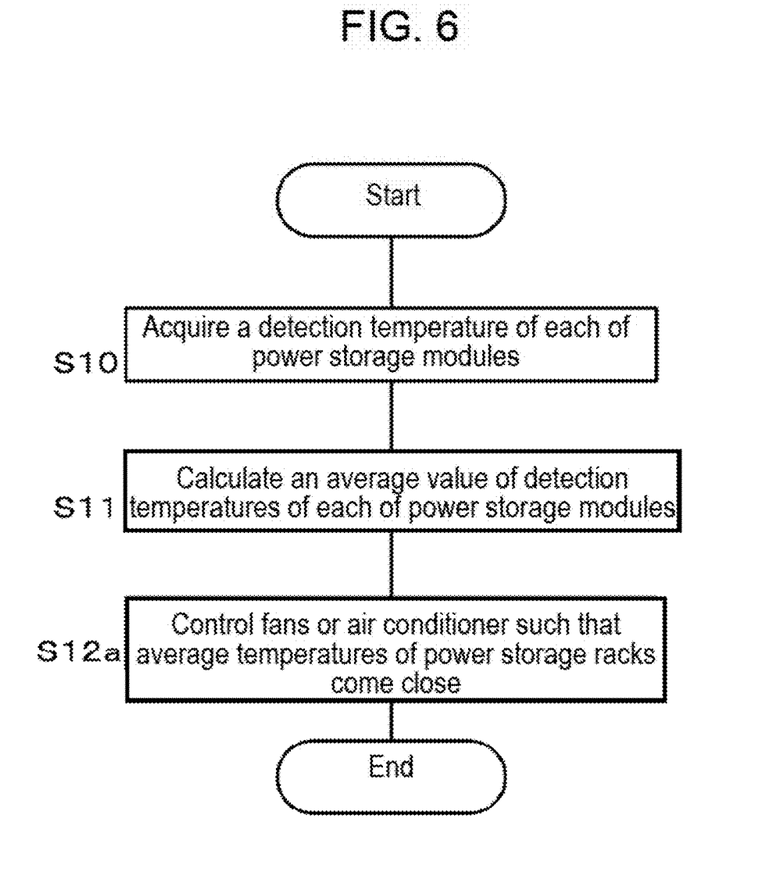
FIG. 6 is a flowchart illustrating another example of the temperature management by the master management device.

FIG. 6 is a flowchart illustrating another example of the temperature management by master management device 22m. This example is a case of configuration where master management device 22m can control air conditioner 50. The processing of step S10 and step S11 of the flowchart in FIG. 6 are the same as step S10 and step S11 of the flowchart in FIG. 5.

Master management device 22m controls the plurality of fans 30aa to 30dc in a rack unit and controls air conditioner 50 such that the average temperatures of the plurality of power storage racks 1a to 1c come close. For example, when master management device 22m can control a direction of a louver of air conditioner 50, master management device 22m adjusts a wind direction such that cold wind is directly applied to power storage rack 1 whose temperature is highest among the plurality of power storage racks 1a to 1c. Furthermore, when the temperature of power storage rack 1 whose temperature is highest among the plurality of power storage racks 1a to 1c is lower than the appropriate temperature range, master management device 22m adjusts an operation mode and the wind direction such that hot wind is directly applied to power storage rack 1 whose temperature is lowest.

Furthermore, when master management device 22m cannot change the wind direction of air conditioner 50, master management device 22m adjusts operation/stop, and/or set temperature of air conditioner 50 depending on a relative temperature of power storage rack 1 located at a position where wind from air conditioner 50 is received most. When the relative temperature of power storage rack 1 concerned is highest, master management device 22m makes air conditioner 50 perform cooling operation. When the temperature of power storage rack 1 concerned is higher than the appropriate temperature range, master management device 22m sets the set temperature of air conditioner 50 low.

When the relative temperature of power storage rack 1 located at a position where wind from air conditioner 50 is received most is not highest, master management device 22m stops operation of air conditioner 50. Note that, when the relative temperature of power storage rack 1 concerned is lowest and temperature of the power storage rack 1 concerned is lower than the appropriate temperature range, master management device 22m makes air conditioner 50 perform heating operation.

Figure 7:
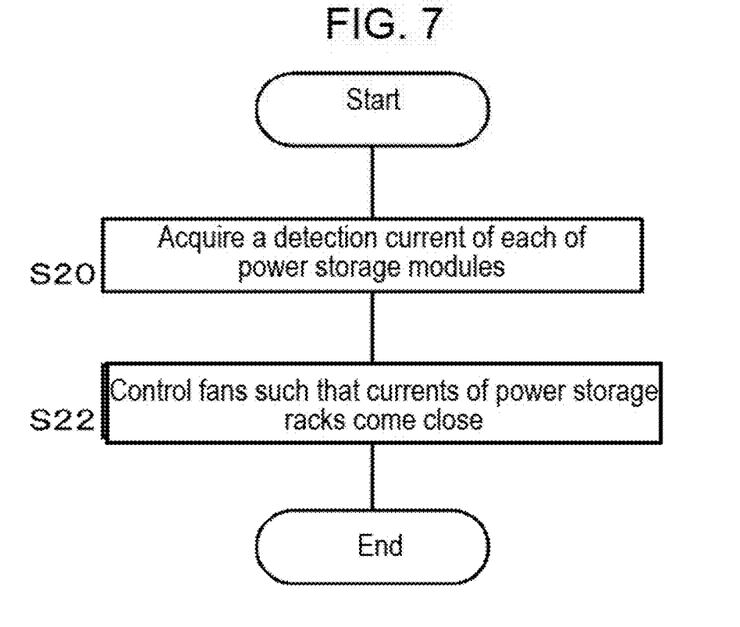
FIG. 7 is a flowchart illustrating an example of current management by the master management device.

FIG. 7 is a flowchart illustrating an example of current management by master management device 22m. In the examples illustrated in FIG. 5 and FIG. 6, control is exemplified in which currents among power storage racks 1a to 1c are equalized by equaling the average temperatures of the plurality of power storage racks 1a to 1c to equalize the resistances among respective power storage racks 1a to 1c. When power storage system es is in charging or discharging, a current can be detected, that, flows in each of power storage racks 1a-1c, making it possible to control the current as a direct target.

Master management device 22m acquires a detection value of the current flowing in each of power storage racks 1a to 1c from the plurality of rack management devices 22a to 22c via communication line 40 (S20). Master management device 22m controls the plurality of fans 30aa to 30dc in a rack unit such that currents flowing in the respective plurality of power storage racks 1a to 1c come close (S22).

For example, even when the average temperatures of the plurality of power storage racks 1a to 1c are substantially the same, there is a case in that resistances of respective power storage racks 1a to 1c largely vary depending on individual differences, replacement times, or the like of respective power storage modules 10. In the example illustrated in FIG. 7, resistances of respective power storage racks 1a to 1c are uniformed to uniform currents of respective power storage racks 1a to 1c by intentionally causing temperature differences among the plurality of power storage racks 1a to 1c.

Master management device 22m increases the resistance of power storage rack 1 in which a large current flows to reduce the current by relatively increasing cooling capacity (performance) of fans 30a to 30d of power storage rack 1 concerned. Specifically, ratios of respective operating capacities of fans 30a to 30d among the plurality of power storage racks 1a to 1c are determined depending on ratios of currents flowing in the respective plurality of power storage racks 1a to 1c. Sensitivity of resistance change of power storage rack 1 with respect to change of operating capacity of fan 30 is determined by referencing to a table generated in advance on the basis of an experiment or a simulation.

Figure 8:
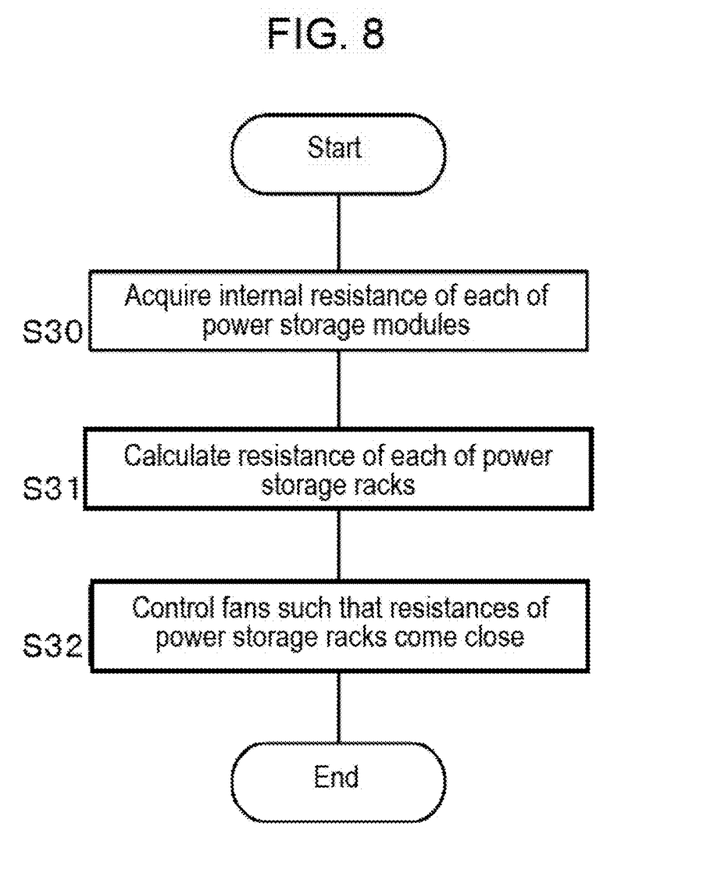
FIG. 8 is a flowchart illustrating an example of resistance management by the master management device.

FIG. 8 is a flowchart illustrating an example of resistance management by master management device 22m. Master management device 22m acquires an internal resistance of each of power storage modules 10aa to 10jc from the plurality of rack management devices 22a to 22c via communication line 40 (S30). For example, master management device 22m makes predetermined standard currents flow in power storage modules 10aa to 10jc, and estimates the internal resistance of each of power storage modules 10aa to 10jc using a relationship between a change in each detection voltage before and after the current flow and the standard current. Note that estimation calculation of the internal resistance may be performed in power storage modules 10aa to 10jc or each of rack management devices 22a to 22c.

Master management device 22m calculates resistances of respective power storage racks 1a to 1c using each of power storage modules 10aa to 10jc thus acquired (S31). Specifically, the whole resistance of power storage rack 1 is calculated by adding the internal resistances of the respective plurality of power storage modules 10a to 10j forming each of power storage racks 1a to 1c and a wiring resistance. When distances among the plurality of power storage racks 1a to 1c are large, lengths of lines between respective power storage racks 1a to 1c and power converter 21 become different, from one another, so that a variation of wiring resistances needs to be considered.

Master management device 22m controls the plurality of fans 30aa to 30dc in a rack unit such that the resistance values of the respective plurality of power storage racks 1a to 1c come close (S32). Master management device 29m increases the resistance of power storage rack 1 whose resistance is relatively small by relatively increasing the cooling capacity (performance) of fans 30a to 30d of power storage rack 1 concerned. Specifically, ratios of respective operating capacities of fans 30a to 30d among the plurality of power storage racks 1a to 1c are determined depending on the resistance ratios of the plurality of power storage racks 1a to 1c.

As described above, according to the exemplary embodiment, occurrence of a variation in currents flowing in the respective plurality of power storage racks 1a to 1c connected in parallel leading to concentration of current in specific power storage rack 1 can be prevented by controlling the plurality of fans 30aa to 30dc in a rack unit, to make the resistances of the respective plurality of power storage racks 1a to 1c come close. This makes it possible to prevent that a large current stress is applied to specific power storage rack 1. This also enables all power storage racks 1a to 1c to be operated within an allowable current, making it possible to secure the maximum power supply capacity (performance.).

The present invention is described above on the basis of the exemplary embodiment. It is to be understood to a person with ordinary skill in the art that the exemplary embodiment is an example and various modified examples of each of components and combinations of each processing process may be made and the modified examples are included within the scope of the present invention.

Although it is premised that shunt resistor Rs and current detector 12c are provided in each of power storage modules 10aa to jc in the above-mentioned exemplary embodiment, a configuration may be employed in which one shunt resistor and one current detector are provided in each rack device 1. In this case, the cost can be reduced.

Furthermore, although a configuration is described in which power storage modules 10 are cooled by air cooling in the above-mentioned exemplary embodiment, power storage modules 10 may be cooled by liquid cooling Master management device 22*m* controls time to flow refrigerant (e.g., water) for circulation in a rack unit. Also, a plurality of heaters may be installed with the plurality of fans 30*aa* to 30*dc*. Master management device 22*m* controls operation/stop and/or a set temperature of the heater in a rack unit. When power storage system es is installed in a cold area, the cooling unit may be omitted and only the plurality of heaters may be installed.

Furthermore, in the above-mentioned exemplary embodiment, an example is described in which master management device 22*m* controls the plurality of fans 30*aa* to 30*dc* in a rack unit. In addition to the control, each of rack management devices 22*a* to 22*c* may individually control corresponding one of the plurality of fans 30*a* to 30*d* belonging to the own rack. For example, when only the temperature of specific power storage module 10 exceeds an appropriate temperature range, only one fan 30 or two fans 30 adjacent to power storage module 10 concerned may be operated.

Figure 9:
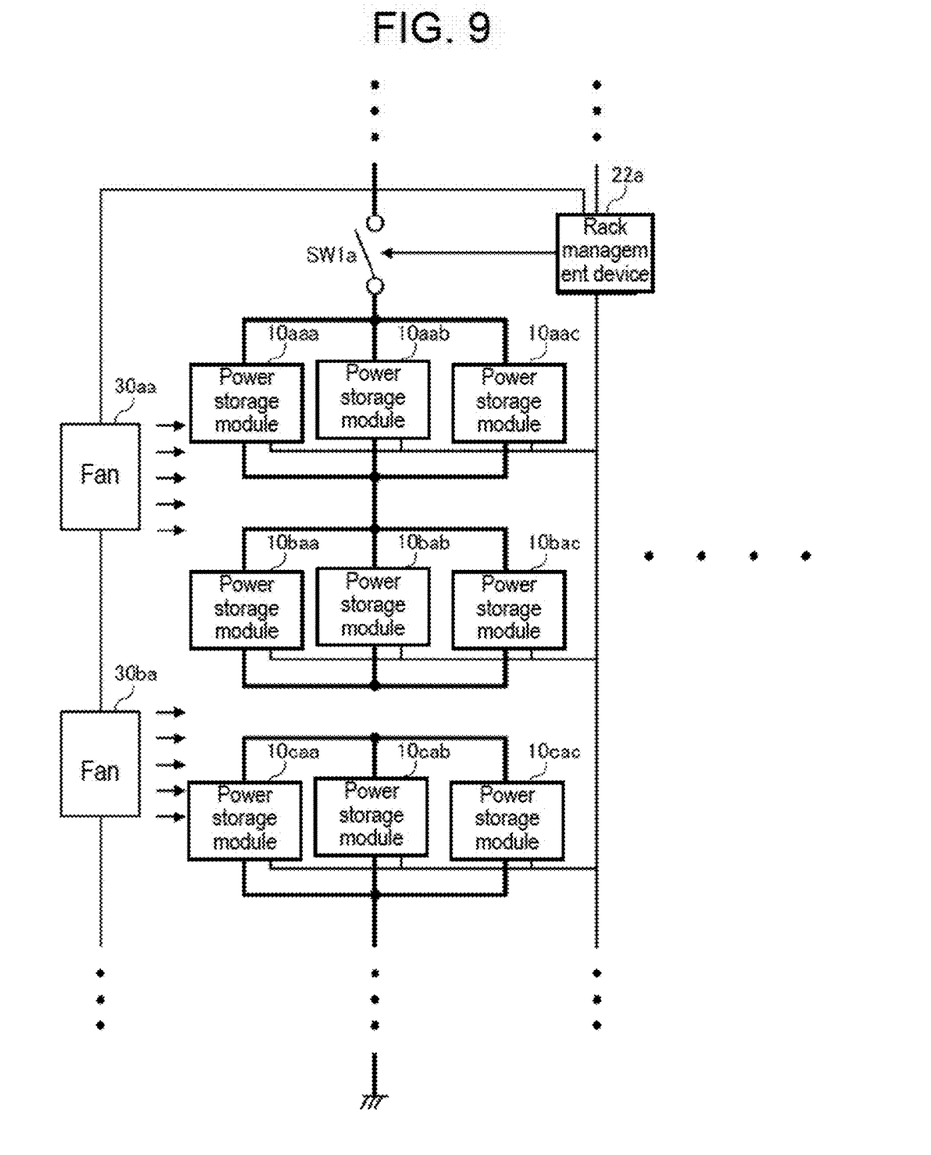
FIG. 9 is a diagram illustrating a connection example of a power storage rack according to a modified example.

In the above-mentioned exemplary embodiment, an example is described in which one power storage rack 1 is configured by connecting the plurality of power storage modules 10*a* to 10*j* in series. In this respect, one power storage rack 1 may be configured by connecting the plurality of power storage modules 10 in series and parallel. Alternatively, as illustrated in FIG. 9, one power storage rack 1 may be configured by connecting in series a plurality of parallel groups each formed by connecting in parallel a plurality of power storage modules 10. In the present description, this connecting example also shall be a mode of connection in series and parallel.

Note that, the exemplary embodiment may be determined by the following items.

[Item 1]

Power storage system (es) including
a power storage unit in which a plurality of power storage module groups (1*a*) are connected in parallel, each of the plurality of power storage module groups including a plurality of power storage modules (10*a* to 10*j*) connected in series or in series and parallel,
a plurality of temperature adjustment units (30*aa* to 30*dc*) installed in each of power storage module groups (1*a* to 1*c*) constituting the power storage unit and configured to cool or heat power storage module groups (1*a* to 1*c*), and
management unit (22*m*) configured to control each of the plurality of temperature adjustment units (30*aa* to 30*dc*) corresponding to each of power storage module groups (1*a* to 1*c*) to make resistances of the plurality of power storage module groups (1*a* to 1*c*) come close.

This system makes it possible to uniform resistances of the plurality of power storage module groups (1*a* to 1*c*) to uniform currents flowing in the respective plurality of power storage module groups (1*a* to 1*c*).

[Item 2]

Power storage system (es) according to item 1, wherein management unit (22*m*) acquires temperatures detected by temperature detectors (T1, 12*b*) installed in each of power storage modules (10), and controls the plurality of temperature adjustment units (30*aa* to 30*dc*) corresponding to each of the plurality of power storage module groups (1*a* to 1*c*) so as to make average temperatures which are each calculated as an average of the detected temperatures of the plurality of power storage modules (10*a* to 10*j*) corresponding one of power storage module groups (1) come close among the plurality of power storage module groups (1*a* to 1*c*).

This system makes it possible to uniform the average temperatures of the plurality of power storage module groups (1*a* to 1*c*) to uniform the resistances of the plurality of power storage modules (1*a* to 1*c*).

[Item 3]

Power storage system (es) according to item 1, wherein management unit (22*m*) acquires currents detected by at least one current detector (Rs, 12*c*) installed in each of power storage module groups (1*a* to 1*c*), and controls the plurality of temperature adjustment units (30*aa* to 30*dc*) corresponding to each of the plurality of power storage module groups (1*a* to 1*c*) so as to make the currents flowing in power storage module groups (1*a* to 1*c*) come close among the plurality of power storage module groups (1*a* to 1*c*).

This system makes it possible to uniform currents flowing in the respect plurality of power storage modules (1*a* to 1*c*).

[Item 4]

Power storage system (es) according to any one of items 1 to 3, wherein the plurality of temperature adjustment units (30*aa* to 30*dc*) are a plurality of fans (30*aa* to 30*dc*), and at least one of fans (30*a* to 30*d*) is installed in each of power storage module groups (1*a* to 1*c*).

This system makes it possible to adjust temperature for each of power storage module groups (1*a* to 1*c*).

[Item 5]

Power storage system (es) according to any one of items 1 to 4, wherein power storage system (es) is installed in a closed space, and
management unit (22*m*) controls air conditioner (50) installed in the closed space to make the resistances of the plurality of power storage module groups (1*a* to 1*c*) come close.

This makes it possible to use air conditioner (50) to uniform the average temperatures of the plurality of power storage module groups (1*a* to 1*c*).

[Item 6]

Management device (22*m*) for controlling power storage system (es) including a power storage unit, in which a plurality of power storage module groups (1*a*) are connected in parallel, and each of the plurality of power storage module groups includes a plurality of power storage modules (10*a* to 10*j*) connected in series or in series and parallel, the management device including,
a plurality of temperature adjustment units (30*aa* to 30*dc*) installed in each of power storage module groups (1*a* to 1*c*) constituting the power storage unit and configured to cool or heat power storage module groups (1),
wherein each of the plurality of temperature adjustment units is controlled corresponding to each of power storage module groups (1*a* to 1*c*) to make resistances of the plurality of power storage module groups (1*a* to 1*c*) come close.

This system makes it possible to uniform the resistances of the plurality of power storage module groups (1*a* to 1*c*) to uniform currants flowing in the respective plurality of power storage modules (1*a* to 1*c*).

The invention claimed is:

1. A power storage system comprising:
a power storage unit in which a plurality of power storage module groups are connected in parallel, each of the plurality of power storage module groups including a plurality of power storage modules connected in series or in series and parallel;
a plurality of temperature adjustment units installed in each of the power storage module groups constituting the power storage unit and configured to cool or heat the power storage module groups;

at least one current detector installed in each of the power storage module groups; and a management unit comprising a controller that is programmed to obtain currents detected by the at least one current detector installed in each of the power storage module groups, and to control each of the plurality of temperature adjustment units corresponding to each of the power storage module groups so as to make the current flowing in the power storage module groups come to equalization among the plurality of power storage module groups.

2. The power storage system according to claim 1, wherein the plurality of temperature adjustment units are a plurality of fans, and at least one of the fans is installed in each of the power storage module groups.

3. The power storage system according to claim 1, wherein the power storage system is installed in a closed space, and the management unit controls an air conditioner installed in the closed space to make the currents flowing in the power storage module groups come to equalization among the plurality of power storage module groups.

4. A management device for controlling a power storage system including a power storage unit, in which a plurality of power storage module groups are connected in parallel, and each of the plurality of power storage module groups includes a plurality of power storage modules connected in series or in series and parallel, the management device comprising:

a plurality of temperature adjustment units installed in each of the power storage module groups constituting the power storage unit and configured to cool or heat the power storage module groups, a controller that is programmed to obtain currents detected by at least one of the plurality of one temperature adjustment units installed in each of the power storage module groups, wherein each of the plurality of temperature adjustment units is controlled corresponding to each of the power storage module groups so as to make the current flowing in the power storage module groups come to equalization among the plurality of power storage module groups.

* * * * *